US010500709B2

United States Patent
Seuferer

(10) Patent No.: US 10,500,709 B2
(45) Date of Patent: Dec. 10, 2019

(54) PAD HANDLE ASSEMBLY

(71) Applicant: GRILL GRUBBER, LLC, Cedar City, UT (US)

(72) Inventor: Kevin J. Seuferer, Osceola, IA (US)

(73) Assignee: Grill Grubber, LLC, Cedar City, UT (US)

( * ) Notice: Subject to any disclaimer, the term of this patent is extended or adjusted under 35 U.S.C. 154(b) by 0 days.

(21) Appl. No.: 15/686,577

(22) Filed: Aug. 25, 2017

(65) Prior Publication Data
US 2018/0056498 A1 Mar. 1, 2018

Related U.S. Application Data

(60) Provisional application No. 62/380,705, filed on Aug. 29, 2016.

(51) Int. Cl.
| | |
|---|---|
| *A47J 37/07* | (2006.01) |
| *B25G 3/26* | (2006.01) |
| *B08B 1/00* | (2006.01) |
| *A47L 17/08* | (2006.01) |
| *B25G 1/10* | (2006.01) |

(52) U.S. Cl.
CPC ............ *B25G 3/26* (2013.01); *A47J 37/0786* (2013.01); *A47L 17/08* (2013.01); *B08B 1/00* (2013.01); *B08B 1/006* (2013.01); *B25G 1/10* (2013.01)

(58) Field of Classification Search
CPC ......... A46B 7/046; A47J 37/086; A47L 13/16
USPC ...... 15/209.1, 210.1, 104.93, 104.94, 229.11
See application file for complete search history.

(56) References Cited

U.S. PATENT DOCUMENTS

| | | | | |
|---|---|---|---|---|
| 809,615 | A * | 1/1906 | Hopkins | A47L 13/29 |
| | | | | 15/231 |
| 830,683 | A * | 9/1906 | Spangler | E04F 21/06 |
| | | | | 15/231 |
| 3,056,987 | A * | 10/1962 | Rifkin | B05C 17/00 |
| | | | | 15/143.1 |
| 4,224,713 | A * | 9/1980 | Trent | B05C 17/00 |
| | | | | 15/210.1 |
| 4,750,233 | A * | 6/1988 | Swain | A47L 13/46 |
| | | | | 15/118 |
| 4,793,019 | A * | 12/1988 | Stima | A47L 13/146 |
| | | | | 15/104.94 |
| 5,402,559 | A * | 4/1995 | Allison | A47L 13/10 |
| | | | | 15/228 |
| 5,479,673 | A * | 1/1996 | Carton | A46B 17/08 |
| | | | | 15/105 |
| 5,522,110 | A * | 6/1996 | Borofsky | A47L 13/12 |
| | | | | 15/115 |
| 6,023,810 | A * | 2/2000 | Gessert | A47J 37/0786 |
| | | | | 15/145 |
| 6,065,178 | A * | 5/2000 | Hsieh | A47L 13/257 |
| | | | | 15/244.1 |
| 6,192,545 | B1 * | 2/2001 | Gessert | A47L 13/022 |
| | | | | 15/229.12 |
| 6,916,382 | B1 * | 7/2005 | Aldredge | A47J 37/0786 |
| | | | | 118/264 |
| 6,966,094 | B1 * | 11/2005 | Rigakos | A47J 37/0786 |
| | | | | 15/111 |

(Continued)

*Primary Examiner* — Michael D Jennings
(74) *Attorney, Agent, or Firm* — Zarley Law Firm, PLC

(57) ABSTRACT

A pad handle assembly having a head and a handle. The handle has an elongated member with a pressure block connected to one end. A pad support block is removably connected to the pressure block to selectively secure a pad around the pad support block.

10 Claims, 3 Drawing Sheets

(56) References Cited

U.S. PATENT DOCUMENTS

| | | | | |
|---|---|---|---|---|
| 7,584,518 B1* | 9/2009 | Morad | ............... | A46B 7/04 |
| | | | | 15/116.2 |
| 7,856,691 B2* | 12/2010 | Viggiani | ............... | B05C 1/06 |
| | | | | 15/118 |
| 8,032,974 B2* | 10/2011 | Carpenter | ........... | A47J 37/0786 |
| | | | | 15/229.11 |
| 8,099,822 B2* | 1/2012 | Dale | ............... | A47J 37/0786 |
| | | | | 15/145 |
| 8,166,597 B2* | 5/2012 | Levitt | ............... | A47L 13/256 |
| | | | | 15/118 |
| 8,671,500 B2* | 3/2014 | Carlson | ............... | A47L 13/34 |
| | | | | 15/209.1 |
| 8,990,998 B1* | 3/2015 | McBride, Jr. | ......... | A47L 13/256 |
| | | | | 15/104.94 |
| 9,375,076 B2* | 6/2016 | Weis | ............... | A46B 7/04 |

\* cited by examiner

US 10,500,709 B2

PAD HANDLE ASSEMBLY

CROSS REFERENCE TO RELATED APPLICATION

This application claims the benefit to Provisional Application U.S. Ser. No. 62/380,705 filed on Aug. 29, 2016.

BACKGROUND OF THE INVENTION

The present invention is directed to a cleaning pad assembly and more particularly to a cleaning pad assembly having a replaceable pad and an ergonomic handle.

Cleaning devices are well-known in the art. As an example, there exist a number of devices for cleaning grills from scrapers to tools having abrasive pads. While these tools are useful, they are limited in their use. For example, once the abrasive pad or bristles become worn, the tool must be thrown away and replaced. Also, because of the shape of these tools they are inefficient cleaning between the grates of a grill and are not ergonomically formed. Therefore, a need exists in the art for a device that addresses these deficiencies.

An objective of the present invention is to provide a pad handle assembly where a pad can be replaced.

Another objective of the present invention is to provide a pad handle assembly that efficiently cleans between the grates of a grill.

A still further objective of the present invention is to provide a pad handle assembly that is ergonomically designed.

These and other objectives will be apparent to one skilled in the art based on the following written description, drawings and claims.

SUMMARY OF THE INVENTION

A pad handle assembly has a head and a handle. The handle has an elongated member with a first end and a second end. A gripping member is attached to the first end and a pressure block is connected to the second end.

A pad support block is removably attached to the pressure block. Finally, a pad is placed around the pad support block and is selectively secured between the pressure block and the pad support block.

DETAILED DESCRIPTION OF THE PREFERRED EMBODIMENT

Figure 1:
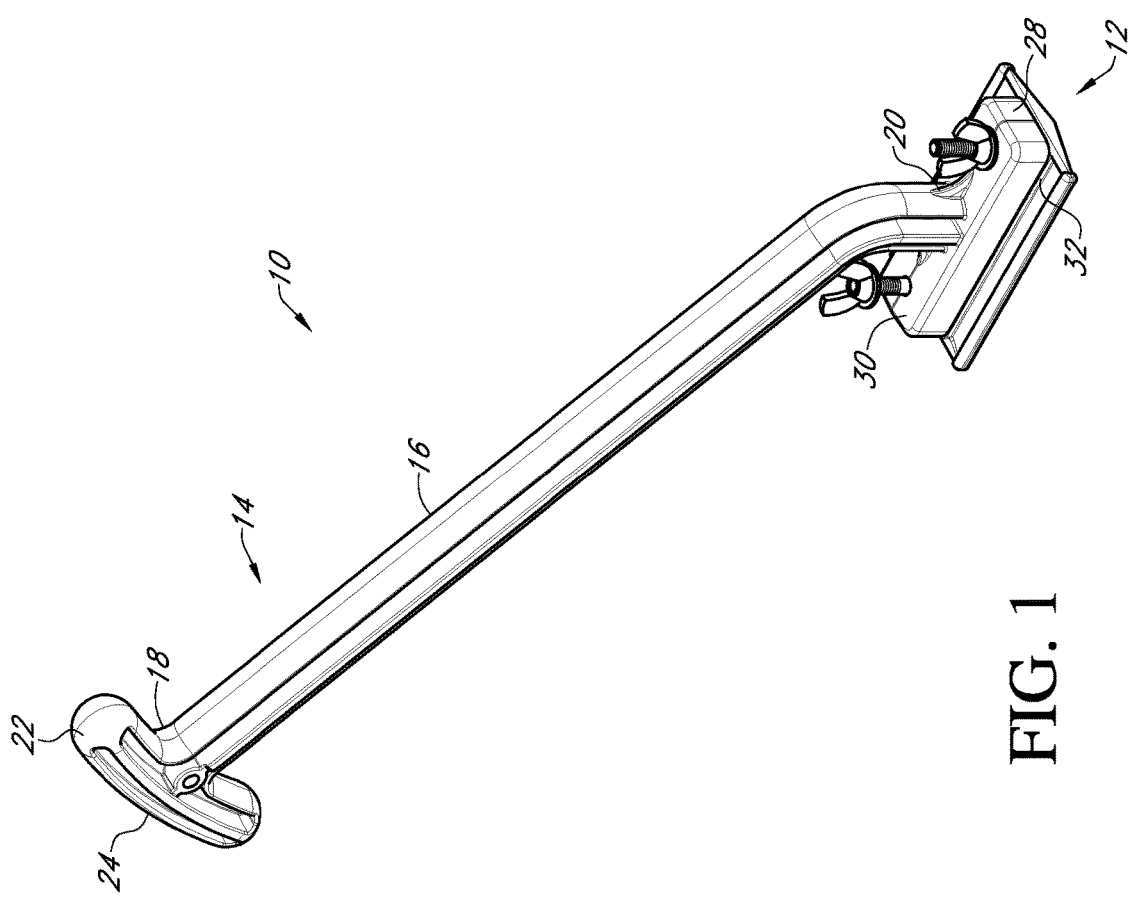
FIG. 1 is a perspective view of a pad handle assembly.
Figure 2:
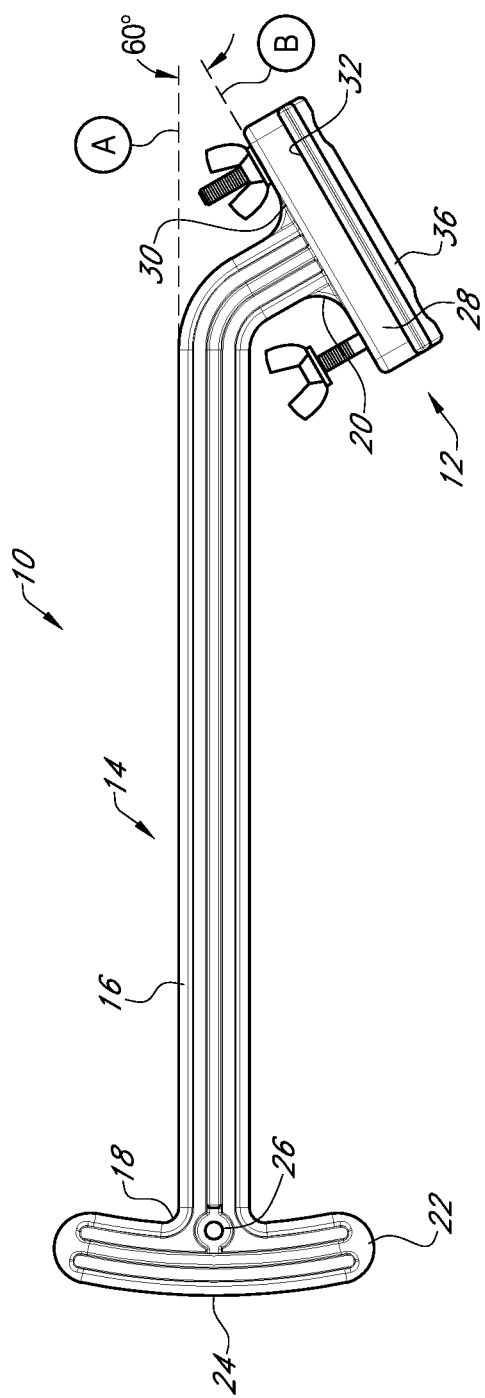
FIG. 2 is a side view of a pad handle assembly.
Figure 3:
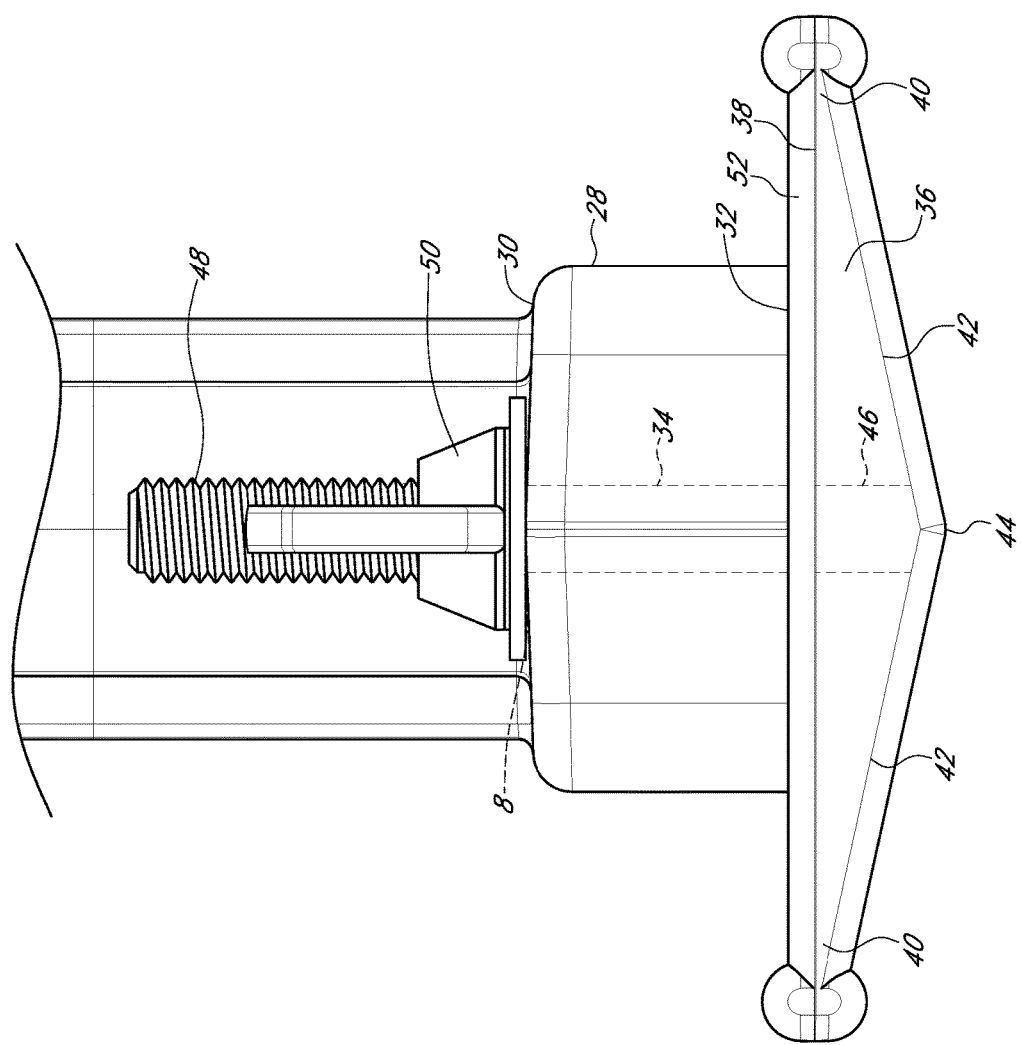
FIG. 3 is an end view of a head of a pad handle assembly.

Referring to the Figures, a pad handle assembly 10 is shown having a head 12 connected to a handle 14. While the assembly 10 may be used with any application, for purpose of example only, the assembly will be shown in relation to cleaning a grill.

The handle 14 has an elongated member 16 having a first end 18 and a second end 20. The first end 18 of the elongated member 16 has a gripping member 22. While the gripping member 22 is of any size and shape, preferably the gripping member 22 is transverse to the elongated member 16 and curved away from the elongated member 16 so that an outer surface 24 of the gripping portion 22 is convex to the elongated member 16. Also, the gripping portion 22 has a bore 26 that receives a strap for hanging.

The second end 20 of the elongated member 16 is connected to a pressure or compression block 28 having a top surface 30 and a bottom surface 32. Preferably, for ergonomic reasons, the second end 20 of the elongated member 16 is curved so that a longitudinal plane A extending through the length of the elongated member 16 is 60° in relation to a plane B of the top surface 30 of the pressure block 28. The pressure block 28 has a pair of bores 34 that extend through the pressure block 28 from the top surface 30 to the bottom surface 32.

Removably connected to the pressure block 28 is a pad support block 36. The pad support block 36 is of any shape and size and in a preferred embodiment has top surface 38 having outer edges 40 and a pair of bottom surfaces 42 that are angled from the outer edges 40 to a bottom apex 44. In an exemplary embodiment the distance from the top surface 38 to the bottom apex 44 of the pad support member 36 is no more than 2.44 inches. This distance permits the pad support member 36 to fit within the slots of a grill.

Extending through the pad support block 36, and in alignment with the bores 34 on the pressure block 28, are a pair of bores 46. Bores 34 and 44 receive bolts 48 that extend therethrough and are secured by a nut 50 such as a wing nut. A pad 52 having an abrasive surface is placed around the pad support member 36 and secured by the pressure block 28 by tightening nut 50 on bolt 48 to apply pressure on the pad 52 between the pressure block 28 and the pad support block.

Accordingly, a pad handle assembly has been disclosed that, at the very least, meets all the stated objectives.

What is claimed is:
1. A pad handle assembly, comprising:
an elongated member having a first end and a second end;
the elongated member having a gripping member, wherein the gripping member is transverse to a longitudinal axis of the elongated member and curved away from the longitudinal axis of elongated member so that an outer surface of the gripping member is convex to the longitudinal axis of elongated member;
a pressure block connected to the second end of the elongated member;
a pad support block removably connected to the pressure block;
a pad placed around the pad support block and selectively secured between the pressure block and the pad support block;
wherein the elongated member and the pressure block form a monolithic body; and
the elongated member is configured to be ergonomic.
2. The assembly of claim 1 wherein the second end of the elongated member is curved so that a plane extending through a length of the elongated member is 60 degrees in relation to a plane of a top surface of the pressure block.
3. The assembly of claim 1 wherein the pad support block has a top surface, outer edges, and a pair of bottom surfaces that are angled from the outer edges to a bottom apex.
4. The assembly of claim 3 wherein a distance between the top surface and the bottom apex of the pad support block is no more than 2.44 inches.
5. The assembly of claim 1 wherein the pad has an abrasive surface.
6. A pad handle assembly, comprising:
an elongated member having a first end and a second end;
a pressure block connected to the second end of the elongated member;

a pad support block removably connected to the pressure block;

a pad placed around the pad support block and selectively secured between the pressure block and the pad support block;

wherein the second end of the elongated member is curved so that a plane extending through a length of the elongated member is 60 degrees in relation to a plane of a top surface of the pressure block; and the elongated member is configured to be ergonomic.

7. The assembly of claim 6 wherein the elongated member has a gripping member at the first end.

8. The assembly of claim 7 wherein the gripping member is transverse to the elongated member so that an outer surface of the gripping member is convex to the elongated member; and the elongated member is centrally located in relation to the gripping member.

9. A pad handle assembly, comprising:

an elongated member having a first end and a second end;

a pressure block connected to the second end of the elongated member;

a pad support block removably connected to the pressure block;

a pad placed around the pad support block and selectively secured between the pressure block and the pad support block;

wherein the pad support block has a top surface, outer edges, and a pair of bottom surfaces that are angled from the outer edges to a bottom apex.

10. The assembly of claim 9 wherein a distance between the top surface and the bottom apex of the pad support block is no more than 2.44 inches.

\* \* \* \* \*